(12) United States Patent
Li et al.

(10) Patent No.: US 9,183,310 B2
(45) Date of Patent: Nov. 10, 2015

(54) DISAMBIGUATING INTENTS WITHIN SEARCH ENGINE RESULT PAGES

(75) Inventors: Kang Li, Sammamish, WA (US); Yi Li, Issaquah, WA (US); Richard Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 13/494,655

(22) Filed: Jun. 12, 2012

(65) Prior Publication Data

US 2013/0332438 A1     Dec. 12, 2013

(51) Int. Cl.
*G06F 17/30*     (2006.01)
*G06F 7/00*      (2006.01)

(52) U.S. Cl.
CPC .... *G06F 17/30867* (2013.01); *G06F 17/30684* (2013.01); *G06F 17/30696* (2013.01)

(58) Field of Classification Search
CPC ............... G06F 17/30867; G06F 17/30684; G06F 17/30696
See application file for complete search history.

(56) References Cited

U.S. PATENT DOCUMENTS

| | | | |
|---|---|---|---|
| 8,214,361 B1* | 7/2012 | Sandler et al. | 707/732 |
| 2006/0161520 A1* | 7/2006 | Brewer et al. | 707/3 |
| 2008/0022211 A1* | 1/2008 | Jones et al. | 715/739 |
| 2008/0208864 A1 | 8/2008 | Cucerzan et al. | |
| 2009/0228439 A1* | 9/2009 | Manolescu et al. | 707/3 |
| 2010/0082590 A1* | 4/2010 | Nye | 707/706 |
| 2010/0114954 A1* | 5/2010 | Sareen et al. | 707/776 |
| 2010/0161592 A1 | 6/2010 | Zhao | |
| 2010/0169343 A1 | 7/2010 | Kenedy et al. | |
| 2011/0029541 A1 | 2/2011 | Schulman | |
| 2011/0213761 A1 | 9/2011 | Song et al. | |
| 2011/0231347 A1 | 9/2011 | Xu et al. | |
| 2012/0096033 A1 | 4/2012 | Shah et al. | |
| 2012/0278127 A1* | 11/2012 | Kirakosyan et al. | 705/7.29 |
| 2012/0278318 A1* | 11/2012 | Reznik | 707/732 |

OTHER PUBLICATIONS

Ashkan, et al., "Classifying and Characterizing Query Intent", In Proceedings of the 31th European Conference on IR Research on Advances in Information Retrieval, vol. 5478, Apr. 6, 2009, pp. 578-586.
Jethava, et al., "Scalable Multi-dimensional User Intent Identification Using Tree Structured Distributions", In Proceedings of the 34th International ACM SIGIR Conference on Research and Development in Information Retrieval, Jul. 24, 2011, pp. 395-404.

(Continued)

*Primary Examiner* — Jeffrey A Burke
(74) *Attorney, Agent, or Firm* — Dave Ream; Jim Ross; Micky Minhas (57) ABSTRACT

Systems, computer-readable media, and methods for generating search engine results pages are provided. A user provides a search engine with one or more query terms. The query terms may be associated with an intent, e.g. product entity, store entity, person entity. The search engine classifies the query and identifies search results that correspond to the query. The search results are grouped based on intents associated with the query. A graphical user interface displays the grouped on search results and allows the user to modify the groupings. The graphical user interface is also updated with entity or entity attributes corresponding to the intents used to group the search results.

18 Claims, 6 Drawing Sheets

(56) References Cited

OTHER PUBLICATIONS

Teevan, et al., "Understanding and Predicting Personal Navigation", In Proceedings of the Fourth ACM International Conference on Web Search and Data Mining, Feb. 9, 2011, pp. 85-94.

Jansen, et al., "Determining the User Intent of Web Search Engine Queries", In Proceedings of the 16th International Conference on World Wide Web, May 8, 2007, pp. 1149-1150.

* cited by examiner

DISAMBIGUATING INTENTS WITHIN SEARCH ENGINE RESULT PAGES

BACKGROUND

The Internet provides access to a vast amount of content. A major challenge given the quantity of content is identifying content that matches a search query provided to a conventional search engine. Upon locating matching content, a search engine result page with the most relevant information is provided to the user that generated the search query.

The conventional search engines perform keyword based matching to locate relevant content. The search query is parsed into keywords that are used to match the content. A match is found based on the similarity between the keyword and terms included in the content. For example, if a user searches for "dinosaurs," the search engine provides the user with a list of search results that are links to content having terms similar to "dinosaurs," e.g., "dinosaur." The search engine may identify "dinosaurs" as a keyword. In turn, the search engine accesses an inverted index to locate content that includes terms similar to the keyword. The inverted index identifies terms and associated content identifiers. The content identifiers link to content having the identified terms. When "dinosaurs" or similar terms are located in the inverted index, the search engine receives a list of content identifiers associated with the terms matching the keyword. The search engine generates search results that include the content identifiers in a ranked order, e.g., similarity or popularity. The similarity rank may be determined by a distance score between the keyword and the index terms. The popularity score may be based on the number of clicks associated with the content. The ranked search results are then transmitted to the client device for display to the user.

Thus, the conventional search engines return search results that match terms included in a search query. The conventional search engines may gather thousands of results for any given query. The search engine, however, only renders the top n results in a search engine result page (SERP). Commonly, n is less than 20. Several SERP are generated to view all of the matching results. In some instances, a user may have to traverse several pages before locating content that the user is interested in. Because search engine queries often consist of keywords or short phrases that are ambiguous in meaning, the SERP provided to the user tend to contain results for the most popular content matching the keyword.

SUMMARY

Embodiments of the invention relate to systems and methods for disambiguating search results based on intents. A search engine may group search results based on the intents that correspond to the search results. In turn, the grouped results are included in SERP that are transmitted from the search engine to the client device. The user at the client device, in some embodiments, may modify the groups and provide the modifications to the search engine.

User queries often contain one or more entities (e.g., a person, location, or organization name) identified by entity name or properties associated with the entity. For example, one query might search for "Barack Obama," while another might search for "President of the United States." Both of these queries are looking for information related to a specific entity. Users may also search for locations, such as restaurants, banks, shopping centers, and so forth. Entities may include any type of nameable things: a business, person, consumer good or service, and so forth. In some embodiments, the intents associated with a query may be determined via the search engine by identifying the entity or entity attributes included in the queries. The identified intent may be stamped on search results having content that matches the entity name or entity attributes. The intent stamps are used by the search engine to form groups of search results that are included in the SERP.

Embodiments of the invention are defined by the claims below, not this Summary. A high-level overview of various aspects of embodiments of the invention are provided here for that reason, to provide an overview of the disclosure, and to introduce a selection of concepts that are further described below. This Summary is not intended to identify key features or essential features of the claimed subject matter, nor is it intended to be used in isolation to determine the scope of the claimed subject matter.

BRIEF DESCRIPTION OF THE SEVERAL VIEWS OF THE DRAWINGS

Illustrative embodiments of the invention are described in detail below with reference to the attached drawing figures, which are incorporated by reference in their entirety and wherein.

DETAILED DESCRIPTION

The subject matter of this patent is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

As used herein, natural user interface (NUI) may be defined as any interface technology that enables a user, advertiser or searcher, to interact with a graphical user interface of a computing device in a "natural" manner, free from artificial constraints imposed by input devices such as mice, keyboards, remote controls, and the like.

The search engine generates SERP pages based on queries received from users. The search engine determines that the queries are associated with one or more intents. A user provides the search engine with one or more query terms. The query terms may be associated with an intent, e.g. product entity, store entity, person entity, etc. The search engine classifies the query and identifies search results that correspond to the query. The search results are grouped based on intents associated with the query. A graphical user interface displays the grouped search results and allows the user to modify the groupings. The graphical user interface is also updated with intent or entity attributes corresponding to the intents used to group the search results. The graphical user interface in some embodiments is configured as a NUI.

In other embodiments, the SERP page includes intents associated with (a) the search results included in a SERP and (b) search results that are not immediately visible in the SERP. The entity names or entity attributes associated with intents may be displayed in the SERP. In one embodiment, the entity names or entity attributes may be used to refine the search query. The search engine may include one or more entity names or entity attributes in a subsequent query that is processed by the search engine to narrow the matching search results. Each intent may have a tag, e.g., graphical indication that uniquely represents the intent. The new result set may include additional content associated with a specific entity, e.g. ACME widget company, that corresponds to the entity name or entity attributes.

The graphical user interface is configured to receive user feedback on the intents associated with the search results and the groups identified for the search results. The graphical user interface provides an interactive SERP pages that allows a user to tag intents associated with the search results. Each intent may have a tag, e.g., graphical indicator. If the search results are in groups and associated with intents, the user may modify the groups by removing search results or adding search results to a group corresponding with one or more intents of interest to the user. The graphical user interface allows users to tag search results related to multiple intents, modify groups of search results, and identify new intents not currently available in the SERP or known by the computing system.

Accordingly, the search engine may enable disambiguation of queries based on, among other things, entities like people, places, restaurants, companies, products, and attributes corresponding to the entities.

Various aspects of the technology described herein are generally directed to computer systems, computer-implemented methods, and computer-readable storage media for, among other things, generating an interactive SERP having intents associated with the search results. The search results in the SERP may be narrowed based on intents and attributes associated with the intents for all search results that match the user query. Each search result may be associated with one or more intents. In certain embodiments, the search engine stamps the search results with the intents and corresponding attributes. Embodiments of the invention allow the user to modify attribute stamps that are associated with the search results.

As one skilled in the art will appreciate, the computer system may include hardware, firmware, software, or a combination of hardware and software. The hardware includes processors and memories configured to execute instructions stored in the memories. The logic associated with the instructions may be implemented, in whole or in part, by hardware logic. For example, and without limitation, illustrative types of hardware logic include field programmable gate array (FPGA), application specific integrated circuit (ASIC), system-on-a-chip (SOC), or complex programmable logic devices (CPLDs). The hardware logic allows the search engine to generate the SERP and the client device to provide feedback on the intents associated with the search results. The computer system may include a search engine, an entity database, a web index, and query logs. The query logs store search queries and frequencies associated with one or more of the following: a number of content accesses associated with each content returned in response to the query, a number of content hovers associated with each content returned in response to the query, or a number of content clicks associated with each content returned in response to the query. The query logs may be stored in the memory of the computer system. The query logs are accessible by the search engine, which is configured to identify intents based on prior queries and frequencies associated with content returned in response to prior queries similar to a current query.

In one embodiment, the memories of the computer system include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating within the computer system. By way of example, and not limitation, computer-readable media comprise computer-storage media and communications media. Computer-storage media, or machine-readable media, include media implemented in any method or technology for storing information on a memory device. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

In yet another embodiment, the computer system includes a communication network having a database, client computers, and a server. The database is configured to store entity indices and content indices. The entity indices store entity information and content associated with the entities. The content indices store content information in term inverted indices having, among other things, data for entities that are associated with the content. A user may provide one or more words at the client computer, which is communicatively connected to the server. The server may operate a search engine that generates a SERP in response to the one or more words received by the server. The SERP is generated based on information stored in the database. In turn, the computer may display the SERP to the user of the client computer. The user may provide modifications to the SERP by updating intents, e.g., entities associated with the search results included in the SERP. Accordingly, a search engine may provide a user with search results that fulfill the intent of the user that provided the one or more terms.

Figure 1:
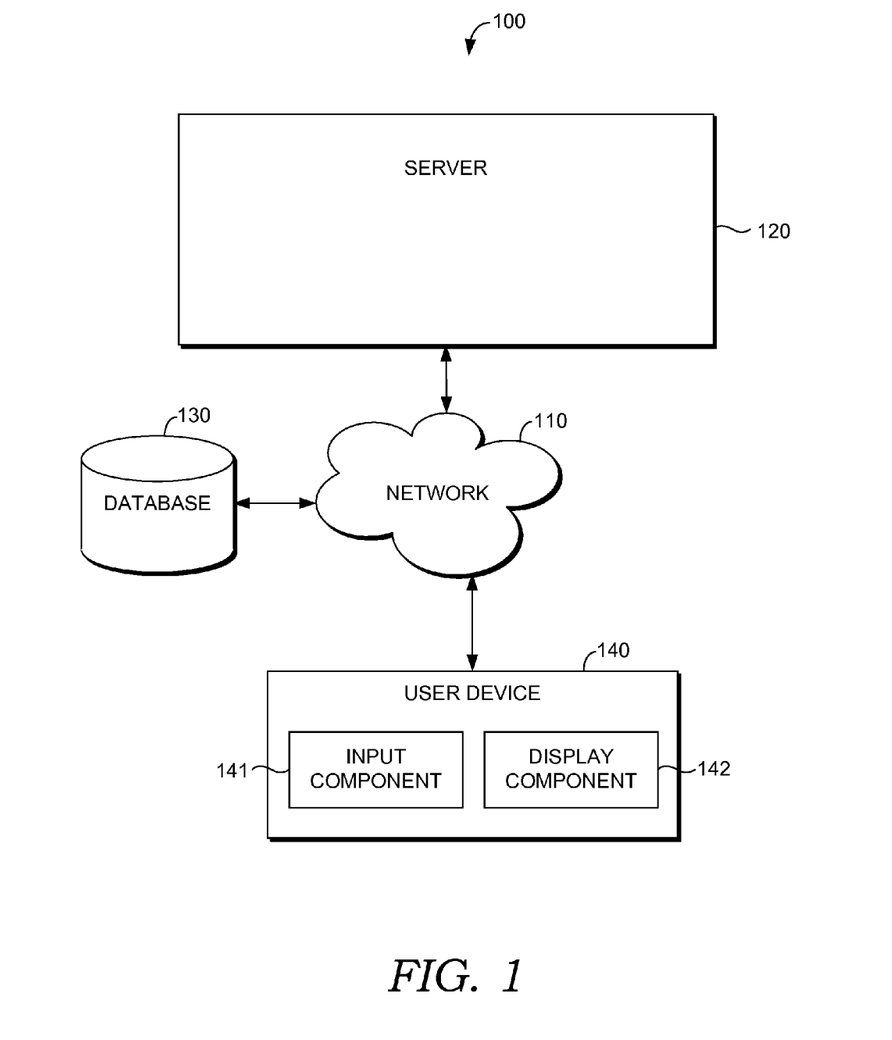
FIG. 1 is a network diagram that illustrates an exemplary computing system in accordance with embodiments of the invention.

FIG. 1 is a network diagram that illustrates an exemplary computing system in accordance with embodiments of the invention. The computing system 100 shown in FIG. 1 is merely exemplary and is not intended to suggest any limitation as to scope or functionality. Embodiments of the invention are operable with numerous other configurations. With reference to FIG. 1, the computing system 100 includes a network 110, server 120, database 130, and user device 140 that receives a SERP from a search engine executing on the server 120.

The network 110 enables communication among the various network devices and resources. The network 110 connects server 120 and database 130. The network 110 also connects the user device 140 to the server 120 and database 130. The network 110 is configured to facilitate communication between the user device 140 and the server 120. It enables the search engine (not shown) to receive search queries generated by the user device 140. In turn, matching uniform resource locators (URLs) located by the search engine are included in a SERP. The server 120 may communicate the SERP over the network 110 to the user device 140. The network 110 may be a communication network, such as a wireless network, satellite network, local area network, wired network, or the Internet. As discussed above, the user device 140 interacts with the search engine utilizing the network 110. For instance, a searcher of the user device 140 may provide the search queries to the search engine. In response, the search engine generates a SERP by interrogating a search term inverted index stored in database 130 for content, including URLs that include web pages, images, videos, or other electronic documents that match the search queries generated by the searcher. Additionally, the user device 140 may provide modifications to the SERP over network 110 to the search engine.

The server 120 executes the search engine. The server 120 is connected to the network 110 and stores the information associated with search sessions, e.g. hover frequency, access frequency, click frequency, query logs, etc. in the database 130. The server 120 provides the SERP to the user device 140 in response to a user query. The server 120 may group the search results included in the search results pages. The groups may be formed by the server 120 based on intents associated with the search results or intents associated with the user query. The query logs and access frequencies are used to group the search results and stamp the results with the corresponding intents. The server 120 may provide an interactive SERP to the user device 140. The user device 140 displays the interactive SERP. The user may enter modifications to the groups displayed in the interactive SERP at the user device 140. In turn, the server 120 receives the user feedback from the user device 140. The server processes updates and regroups the search results based on the feedback.

In certain embodiments, the server 120 tracks content requests and navigation to content to maintain counts associated with the number of times the content is accessed, hovered, or clicked during a session associated with the user query. The counts maintained by the server 120 may be used to rank the intents corresponding to search results.

The database 130 stores, among other things, entity data and content data. The database 130 may be a relational database, an object oriented database, a hierarchical database, etc. The entity data is stored in an entity index. The content data is stored in a web index. The entity data stored in the database 130 may include, among other things, person, company, product, or location information.

The database 130 is accessed by the search engine to obtain search results and to identify intents associated with the search results or user queries. The content data stored in the database 130 may include images, documents, webpages, movies, audio, or other electronic content. In one embodiment, that content may be identifiers, e.g., URLs or uniform resource identifiers (URIs) for images, documents, webpages, movies, audio, or other electronic content.

The entity index stores entity information. The entity information includes data from third-party sources. In some embodiments, the third-party sources are paid sources that provide attribute information for entities. The third-party sources may include, among other sources, personal directory providers, business directory providers, movie directory providers, hotel directory providers, encyclopedia providers, and product catalog providers. The information obtained from the third-party sources may include attributes like name, address, date of birth, price, interests, publications, title, size, color, gender, etc. The attributes are stored in the entity index. The entity index is updated in real-time or on a periodic basis as new directories become available. For instance, the entity index may be updated daily, monthly, quarterly, yearly, etc.

In other embodiments, the entity information is gathered by a crawler that accesses public information. The entity index stores the name of the entity and corresponding entity attributes. Each record in the entity index is associated with a new entity. The attributes are populated from the content gathered by the web crawler. The crawler extracts the attribute data from the content. The record in the entity index may store content identifiers for each content that is used, by the crawler, to extract information for the record. The crawler receives discovered content and detects one or more entities embedded within the discovered content. For example, discovered web pages may be provided to the crawler. The crawler extracts any entities that are mentioned in the web page. The crawler may discover entities based on natural language processing, part-of-speech analysis, or by applying other textual, link analysis, or other content analysis techniques. The crawler may operate on a variety of types of content, including textual, audiovisual, images, and so forth.

Each entity is associated with attributes. The server 120 may query the database 130 by entity name or attributes. The crawler populates the entity index and merges fragmented records referring to the same entity. The crawler also creates the entity index to store relationships between detected entities and content related to the detected entities. The entity index may include the reverse index described above in which entity identifiers can be used to find content pages related to a particular entity identifier. The crawler may create and maintain a separate index or may build upon an existing index of content by adding appropriate metadata and lookup functions for accessing the entity index based on entities.

Furthermore, the entity index may be updated with entity information from expert reviewers. The expert reviewers may specialize in fields like math, finance, housing, mobile phones, games, etc. When a new entity is created in the field, the specialist may update the index with the new entity and attributes for the new entity.

Accordingly, the entity index may be maintained by crawling to find information, by expert editors who periodically contribute information to the index, and by third-party updates. In some embodiments, the entity index maintains a list of alternate forms of appearances for each entity, and supports efficient retrieval of related entities based on exact or fuzzy string matches.

In one embodiment, the entity index may store implicit or explicit feedback received from a user. The feedback may associate entities and queries or associate entities and documents. The user may provide implicit feedbacks by clicking the entity in the SERP that matches their intent. For example if a user searches for "the movie about a big ship that hits an iceberg" and clicks on the film entity "Titanic," the click is recorded as implicit feedback. The query text that led to the click and the click count may be stored in the entity index. This implicit feedback may also be stored in the entity index by adding or removing intents associated with the entity. Other types of implicit feedback include a click on an entity result followed by a click on a document result or vice versa. These types of implicit feedback indicate an association between an entity and a document. This implicit feedback may also be stored in the entity index by adding or removing content identifiers associated with the entity.

Users may provide explicit feedback by explicitly notifying a search engine that an entity result is not what they are looking for. For instance, the SERP may present a link or button next to each entity result. The link is clickable to notify the search engine that a result is incorrect or unsatisfactory for the query. Users can also provide explicit feedbacks by linking (bookmarking) or unlinking the documents related to an entity through the SERP. This explicit feedback may also be stored in the entity index by adding or removing content identifiers associated with the entity.

In certain embodiment, the feedback may be for particular attributes or actions of an entity instead of the entity as a whole. For example, if a user queries for "MIB 3 trailer," the SERP may display the details of the "Man in Black 3" movie entity including a clickable link to its trailer. The clicks on the trailer link by the user will be recorded and associated with the "trailer" attribute of the movie entity in the entity index. Another example is the query "canon 5d where to buy." The SERP may show a list of stores that offers the camera for sale. Then the clicks on the store links by the user are implicit feedbacks on the relevance and preference of the stores. The store information may be recorded in the location attribute or purchase attribute of the cannon entity.

The database 130 stores entity information describing entities detected in the corpus of content and the corresponding feedback. The database 130 may include a database or other storage facility with records that the system can create or update to store newly discovered entity information. For example, the system may maintain a database row for each entity with metadata describing known information related to the entity as well as a table of relationships between entities and content items. Those of ordinary skill in the art will recognize various storage mechanisms for storing such information for fast retrieval during client search requests.

The server 120 searches the entity index to locate entities or entity attributes that match a user query. In some embodiments, the content identifiers from the entity index may be included in the SERP as search results. The server 120 may also search the web index to locate search results that match the user query. The entities and entity attributes included in the web index for the search results may be retrieved by the server 120 and stamped on the corresponding search results. In other embodiments, the content identifiers retrieved from the entity index are stamped with the entity and entity attributes associated with matching entities. Accordingly, the search results from the web index are mapped to entities located in the entity index that match the query.

The database 130 may include one or more files, file systems, hard drives, databases, storage area networks, cloud-based storage services, or other facilities for persistently storing information. The database 130 may include one or more interfaces through which users or software programs may add, delete, and update entity information, including information related to newly discovered entities. In some embodiments, the crawler scours the Internet periodically to discover and add entity information to the database 130. The database 130 also includes interfaces for the search engine to access and obtain records that match the user query.

The web index in some embodiment is maintained by a web crawler. The web crawler indexes content discovered on the Internet based on keywords associated with the content. The web crawler may update the web index periodically. The web index may be updated monthly, quarterly, yearly, etc. The web index stores keywords and corresponding content identifiers linking content that match the keywords. The keywords are identified based on frequency within the content. The web index may also include intents associated with the content identified by the web crawler.

The intents may be determined, by the server 120, from query logs having representative terms, e.g., dominant terms, and large click frequencies for the content corresponding to the content identifier. The dominant terms are words or phrases that frequently occur in multiple queries, in the content, and in predetermined sections of the content, e.g., title, abstract, or conclusion.

In some embodiments, the web indices may be expanded to incorporate entity information and metadata for responding to entity-based queries. The web index may also include entities associated with the identified content. The entities, in at least one embodiment, represent the intent that corresponds to the content of the content identifier. The web index may link to the entity index using entity identifiers. The web index may retrieve the entity and entity attributes from the entity index. In certain embodiments, the entity index is separate from the web index. In other embodiments, the web index and entity index are combined.

The user device 140 allows the searcher to view a SERP received from the search engine. In some embodiments, the SERP includes advertisements that correspond to the results in the SERP. The user device 140 is connected to the search engine via network 110. The user device 140 is utilized by a user to generate search queries, to hover over objects, to select links or objects, and to receive SERP or web pages that are relevant to the search terms, the selected links, or the selected objects. The user device 140 includes, without limitation, personal digital assistants, tablets, smart phones, laptops, personal computers, gaming systems, set-top boxes, or any other suitable client computing device. Accordingly, the user device 140 may range from full resource devices with large storage capacity and processing power, e.g., personal computers and game consoles, to low-resource devices with small storage capacity and few processing resources, e.g., traditional set-top boxes and hand-held game consoles. In some embodiments, the user device 140 obtains user consent to monitor or track location information, browsing activity, and demographic information. The consent includes, among other things, permission to process the user's biometric information or gestures detected by the user device 140.

In one embodiment, the user device 140 includes user and system information storage that stores searcher and system information on the user device 140. The searcher information may include search histories, cookies, and passwords. The system information may include Internet Protocol addresses, cached web pages, and system utilization. The user device 140 communicates with the search engine to receive the search results or web pages that are relevant to the search queries, the selected links, or the selected objects. The user device 140 may communicate with the server 120 to receive advertisements related to the search query. The advertisements may be received directly from database 130 or proxied by way of the server 120. For instance, upon receiving a query including the word "car" from the user device 140, the server 120 may provide one or more advertisements that include related items like insurance, mechanics, or dealerships.

In some embodiments, the searcher may interact with the user device 140 through a controller, such as, a stylus, a keyboard and a mouse, or a natural user interface (NUI). The NUI includes air gestures, voice, or other physiological inputs generated by the searcher. These inputs may be interpreted as search queries by the user device 140, which transmits the search queries. Alternatively, the user device 140 may provide the inputs received by the user device 140 directly to the search engine. The NUI implements any combination of speech recognition, touch and stylus recognition, facial recognition, biometric recognition, gesture recognition both on screen and adjacent to the screen, air gestures, head and eye tracking, and touch recognition associated with displays on the user device 140. The user device 140 is equipped with depth cameras, such as, stereoscopic camera systems, infrared camera systems, Red Green Blue (RGB) camera systems, and combinations of these for gesture detection and recognition. Additionally, the user device 140 may be equipped with accelerometers or gyroscopes that enable detection of motion. The output of the accelerometers or gyroscopes is provided to the display of the user device 140 to render immersive augmented reality or virtual reality.

The user device 140 is configured to receive one or more inputs via touch interaction with a hardware component, such as a screen or other controller of the user device 140. Touch interaction may involve pressing a button, moving a joystick, movement across a track pad, use of a touch screen of the user device 140 (e.g., detection of a finger or a stylus), and so on. Recognition of the touch inputs may be leveraged by user device 140 to interact with a user interface of applications, e.g., search, media, editing, gaming, etc. executing on the user device 140.

As discussed above, the natural user interface may recognize nontouch interactions. For example, the user device 140 may be configured to recognize audio inputs through use of a microphone. For instance, the user device 140 may execute voice recognition to recognize particular utterances (e.g., a spoken command) or to recognize a particular searcher that provided the utterances. In another example, the user device is configured to recognize gestures, presented objects, images, and so on through use of cameras. The user enters a user query and feedback via user device 140.

Accordingly, the computing system 100 is configured with a server 120 that executes a search engine. The search engine returns a SERP based on a user query received from user device 140. The search query generated by the user device 140 is received by the search engine, which provides results, including matching advertisements obtained from server 120. The server obtains the results from the database 130. The search engine transmits the results to the user device 140. In turn, the user device 140 renders the results for the searchers.

Embodiments of the invention provide a search engine that groups search results based on intent. The search engine includes a grouper component that organizes the search results into groups. The grouper component includes an intent detector component, a ranker component, a presenter component, a feedback component. The intent detector receives a user query and corresponding search results and identifies intents that correspond to the search results. The ranker component ranks the search results within each group. The presenter component formats the grouped search results for display to the user. The feedback component receives feedback from the user regarding the groupings. The feedback may include modifications to the number of search results included in the groups.

Figure 2:
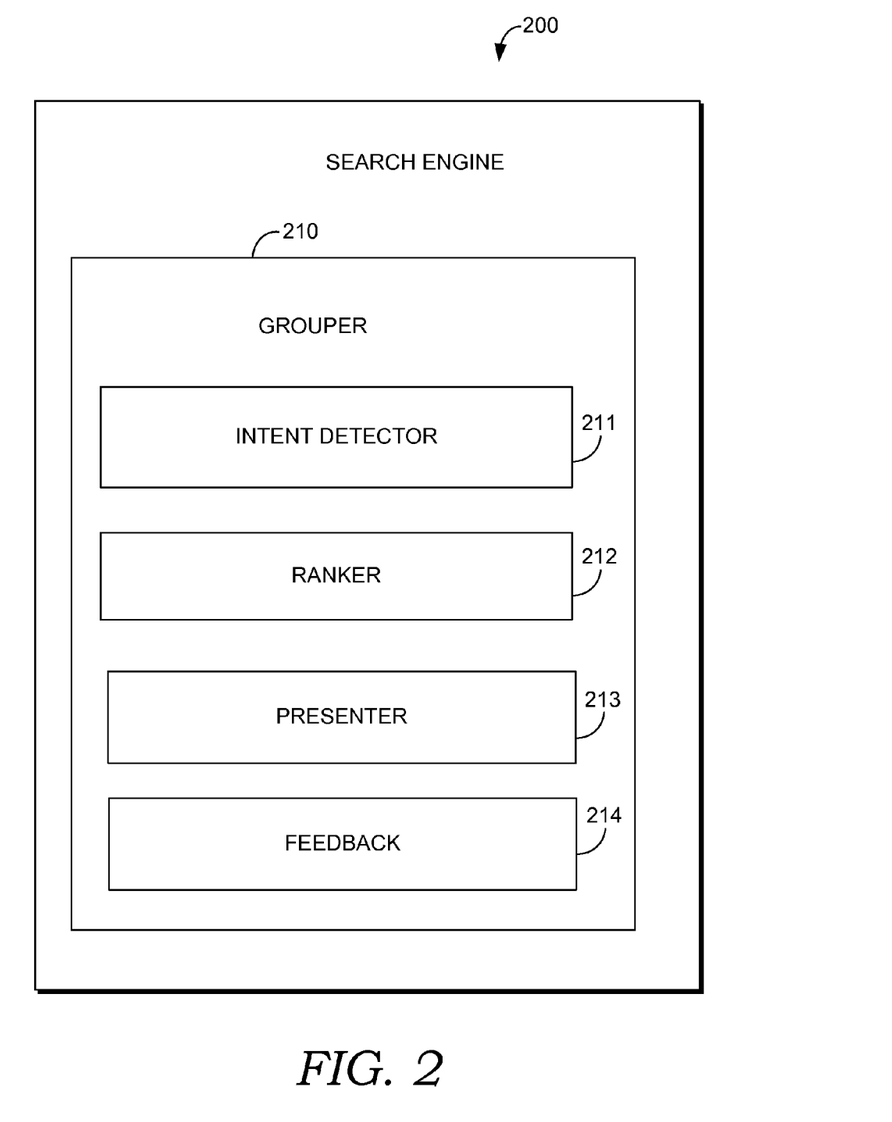
FIG. 2 is a component diagram illustrating an exemplary search engine in accordance with embodiments of the invention.

FIG. 2 is a component diagram illustrating an exemplary search engine 200, in accordance with embodiments of the invention. The search engine 200 executes a grouper component 210. The grouper component 210 comprises an intent detector component 211, a ranker component 212, a presenter component 213, and a feedback component 214.

The grouper component 210 is configured to identify intents associated with search results corresponding to the query. The grouper ranks the intents corresponding to the search results. In turn, the top k intents are returned where k is less than five. The search results are grouped based on intent and configured for display to the user in an interactive SERP. The interactive SERP allows the user to provide modifications to the groupings. In turn, the search engine 200 receives the modifications and updates the groupings presented to the user based on the modifications received from the user.

The intent detector component 211 parses a query received at the search engine and analyzes the search results associated with the query to identify one or more intent, which may include entity names or entity attributes. The user query may be sent to an entity index and a web index. The web index returns content identifiers and one or more entities corresponding to the content associated with content identifiers. The content matches the query. The entity index returns entities and one or more content identifiers associated with the entities. In one embodiment, the intent detector 211 executes a query classifier that recognizes entity names or entity attributes in the query. The query classifier parses the query to identify a pattern for the entity or entity attributes. The entity information may be used to interrogate the entity index for matches. The matching entities and related content may be included in the search results.

The intent detector 211 receives the results from the entity index and the web index. In one embodiment, the input box on the SERP may be updated, by the intent detector 211, to display information associated with the entities identified by the web index or entity index. The input box may display the entity attributes that are used to further refine the query. Optionally, a user may select a suggested refinement to narrow the search result size.

In another embodiment, the content identifiers for each result are located, by the intent detector 211, in query logs maintained by the search engine 200. In turn, the prior queries and content statistics are analyzed by the intent detector 211 to identify representative terms. The content statistics include hover frequency, access frequency, and click frequency. The content may be ordered, by the intent detector 211, based on frequency in descending order. In turn, the representative terms, which include the dominant terms, are extracted and returned as intents. Duplicate terms are combined. In turn, the input box on the SERP may be updated, by the intent detector 211, to display information associated with the representative terms identified from the query logs. The input box includes the representative terms, which may be used to further refine the query. Optionally, a user may select a suggested refinement to narrow the search result size. In some embodiment, the prior queries may correspond to entities identified in the entity index. If the query logs include an entity included in the entity index, one or more of the prior queries having the entity may be displayed in the input box to refine the user query. Additionally, in certain embodiments, the attributes associated with the entity may be obtained from the entity index and displayed in the input box. The prior queries are from any user that submitted a query to the search engine 200.

The intents or entities identified by the intent detector 211 may be associated with the user query. A list may be created by the intent detector 211 to store the query and the intents or entities corresponding to the query. For instance, a query for a coffee shop may be associated with a store intent, e.g., a user is looking for a coffee shop or an owner intent, the user is looking for the owner of the coffee shop. The intent detector component 211 is configured to identify these intents from the web index, entity index, and query logs. The intent may be anything of interest to the user, e.g., a person's name, hotel, or product, entity name, etc. For instance a user query "John Smith Seattle" received by the search engine may return several results that match the name and location properties. The matches may be limited based on the popularity of the content associated with results. The matches may also be limited based on the attributes associated with the identified intents. For instance, a neighborhood intent, e.g., "Capitol Hill," may be surfaced to limit the matches.

The ranker component 212 ranks the intents identified by the intent detector 211. The ranker component 212 may also rank the content associated with the intents. The ranker component 212 calculates a score for each intent identified above based on its relevance or distance to the query. The score may be a similarity score or an edit distance score. The top m intents may be displayed to the user, where m is less than five. The intent score may be based on similarity between the query and attributes associated with the intent, e.g., entity attributes. On the other hand, the content score may be based on matches between the entity attributes and content included in the search results.

The presenter component 213 configures the interactive SERP with ranked content in groups. Each group is associated with an intent or entity. The groups are configurable based on the feedback. In some embodiments, the interactive SERP lists the top five intents and displays the grouped content for at least three of the five intents. In some embodiments, the presenter component 213 may further limit the search results based on profile information associated with the user that issued the user query. The profile information is used to identify the grouped content matching the profile information. The profile information includes employment data, age, interests, location, etc. of the user. The profile information is available only during private mode. Private mode is available based on services logged-in by the user during the search session. The services may include a social network application, an email application, a messaging application, etc. The profiles from the services are made available when the search engine 200 determines the client device is operating in a private mode as opposed to a public mode. The private mode is identified when the user provides the user query to the search engine while logged-in to at least one of the services. In some embodiments, the presenter component 213 stamps each result with attributes associated with the identified intent. The attributes, in some embodiments, may be retrieved from the entity index. The stamp may include the entity identifiers and corresponding attributes. In other embodiments, the stamps may be associated with each group as opposed to each result within the groups.

The feedback component 214 is available for users that are logged in to at least one service associated with the search engine 200. The services may include a social network application, an email application, a messaging application, etc. The feedback component is made available when the search engine determines the client device is operating in a private mode as opposed to a public mode. The private mode is identified when the user provides a user query to the search engine 200 while logged-in to at least one of the services. The feedback component 214 allows the user to verify the accuracy of the groups or modify the groups. The modifications to the groups include removing content from a group or adding content to a group. The user may select interested entities included in the interactive SERP. In turn, the user may remove intent tags for search results that the user believes are improperly grouped. The user may also correct the intent or entity associated with the search results. The user is able to modify intents and include intents or new intents for search results not currently grouped by the search engine with any of the intents. For example, the interactive SERP includes buttons that will be displayed next to each search result to allow the user to associate each result with one or more intents or add new intents. The modifications to the groups or intents by the user may enrich the database. These modifications may be stored and used for subsequent queries by the user or other users.

The search engine 200 may receive and respond to queries for, among other things, a person, person and birthday, actor name from movie, restaurant name, best games for gaming system or PC, etc. The grouped search results may include search results and intents corresponding to the search results. For example, game query results generated by the search engine may include games grouped based on gaming system, games grouped based on click frequency, or games grouped based on sales figures. The search engine 200 identifies the intents or entities that are used to group the search results. The intents may be determined from query logs associated with prior queries.

In some embodiments, the search engine provides stamped search results to the user. The stamps include intent or entity information. The stamps are used to group the search results. The search engine receives the entity information for the stamps from the entity index. In other embodiments, the intent attributes may be received from the query log or the web index.

Figure 3:
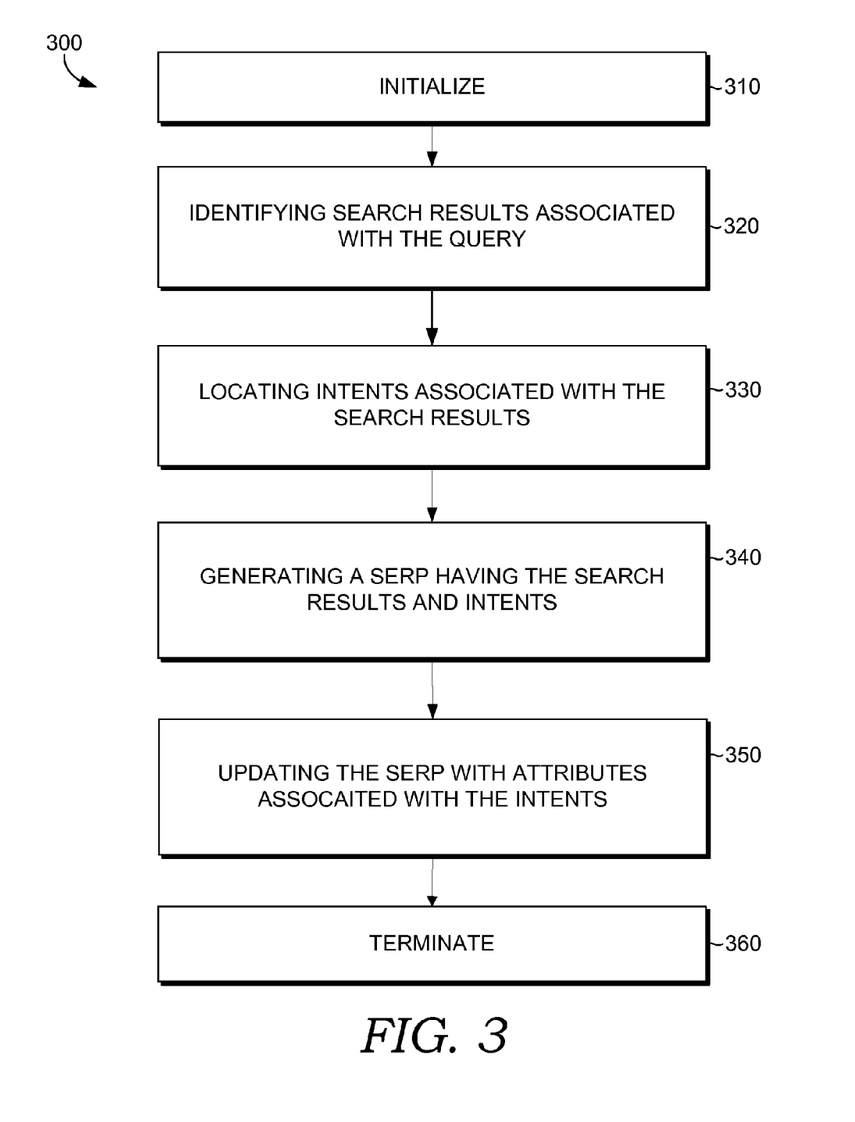
FIG. 3 is a logic diagram illustrating an exemplary computer-implemented method to provide search results in accordance with embodiments of the invention.

FIG. 3 is a logic diagram illustrating an exemplary computer-implemented method to provide search results, in accordance with embodiment of the invention.

The method initializes, in step 310, when a server having a search engine is powered on. The search engine receives a query from a user. The query may include an entity or entity attribute. In step 320, the search engine identifies search results associated with the query. In turn, the intents for the search results are located, in step 330. The search engine generates a SERP having the search results and intents corresponding to the search results, in step 340. The search engine may group the search results based on intents.

In one embodiment, the search engine may receive user feedback on the groups, wherein the feedback verifies the search results in the group, removes one or more search results, or adds one or more search results to the groups. The feedback is received from users that are logged in to one or more services associated with the search engine during the search session. The services include a social network application, messaging application, or an email application. The search engine modifies the groups based on feedback that adds one or more search results to the groups or removes one or more search results from the groups.

The search engine, in step 350, may update the SERP with attributes associated with the intents. The attributes may be images that represent the associated intent. An electronics images for an electronic product intent. In some embodiments, the attributes are entity attributes. The attributes may include gender, employment, cost, name, etc. The search engine accesses an entity database to locate one or more record that match the entity or entity attributes included in the query. The entity attributes associated with the matching records may be included in the SERP for display on the user device.

The search engine transmits the updated SERP for display on a user device. In one embodiment, the entity attributes may be displayed in an input box to augment the current query. The search engine may receive a selection of the entity attributes displayed in an input box of the SERP to refine the query. The method terminates in step 360.

Accordingly, the search engine may disambiguate queries by refining the user query or grouping the search results based on the intent identified in the search results. The refinement leverages attributes of the intents or entities to provide narrower search results to the user. The search engine may re-query the database using a selected refinement. This allows the search engine to find results specifically associated with a particular specified entity or entities having the selected attributes.

In another embodiment, the search engine determines whether the client device is in a public mode or private mode. In private mode, the search engine is configured to provide a user with search results that are targeted to the user based on the services currently utilized during the search session. In public mode, the search engine does not target the search results based on the profile information.

Figure 4:
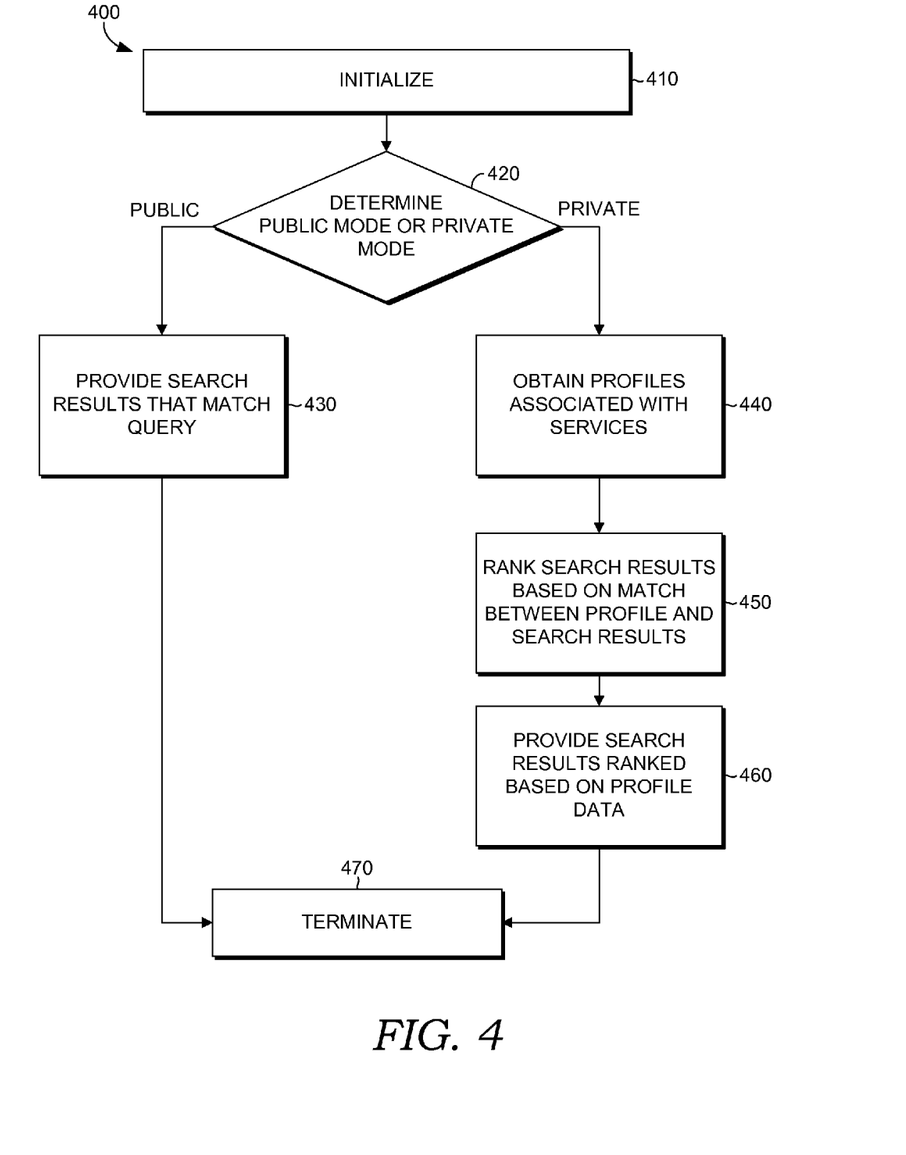
FIG. 4 is another logic diagram illustrating an exemplary computer-implemented method to provide search results based on whether the client is in a public mode or private mode in accordance with embodiments of the invention.

FIG. 4 is another logic diagram illustrating an exemplary computer-implemented method to provide search results based on whether the client is in a public mode or private mode, in accordance with embodiments of the invention. The method initializes, in step 410, when a server having a search engine is powered on. The search engine receives a query from a user. In step 420, the search engine determines whether the client is in public mode or private mode. Private mode is enabled when the user is logged-in to one or more services associated with the search engine during the current search session. Public mode is enabled when the user is not logged-in to the one or more services associated with the search engine. In some embodiments, the search results are associated with intents based on representative terms included in prior queries and click frequencies associated with the search results as recorded in a query log. The search results may be grouped based on the identified intents.

When the user is in public mode, in step 430, the search engine provides search results that match the query. When the user is in private mode, in step 440, the search engine obtains profiles associated with services logged-in to by the user. In step 450, the search engine ranks the search results based on matches between the profile information and the search results. The search engine, in step 460, provides search results in rank order based on the profile information. In private mode, the click frequencies and prior queries obtained from the query log to identify intents may be associated with the user that is logged in to the one or more services. The search results may be grouped based on intents identified, by the search engine, from the user search history. The intents may include entity name or entity attributes. In one embodiment, the search engine may match the user profile information with the entity attributes to further narrow the results to ensure the results are relevant to the user. The method terminates in step 470.

As described above, in private mode, the search engine provides search results that match the query and profile information associated with the one or more services that user is logged-in to and ranking the search results based on the match between the search results and user profile attributes maintained by the one or more services. For example, a user that works at a coffee shop may be logged in to a social network application. The user may have a profile that lists the name of the coffee shop, the coffee shop location, etc. The user may enter a query for a coffee shop colleague "Jay Barrister." The search engine may access the profile of the user and process the profile information to promote results matching the query and the profile, including the employment information stored in the profile. Thus, the search engine will return results that match the name of the employer coffee shop included in the profile and the terms "Jay Barrister."

The interactive SERP provided to the user may vary based on whether the user in private mode or public mode. In one embodiment, the private mode interactive SERP allows the user to modify the groups. The public mode interactive SERP, on the other hand, does not allow the modifications to the groups. Both versions of the interactive SERP, however, allow the user to refine the query based on attributes associated with intents identified by the search engine.

Figure 5:
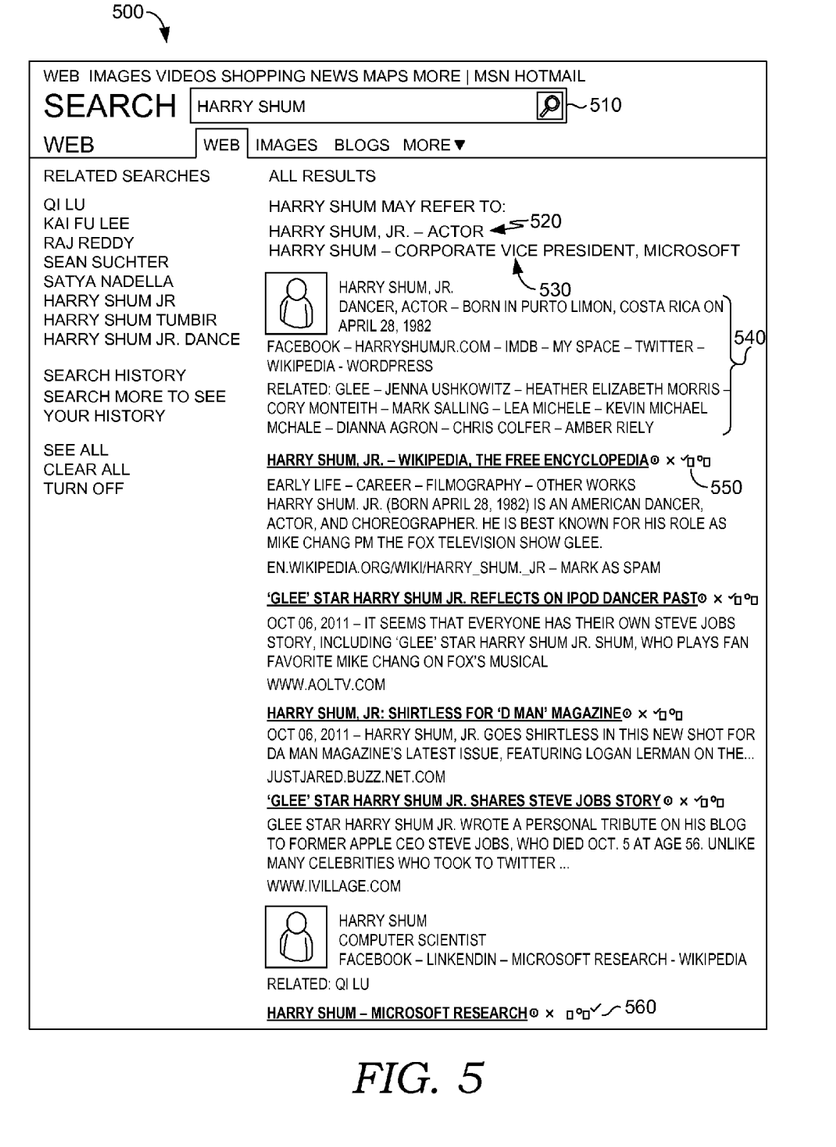
FIG. 5 is a graphical user interface illustrating search results grouped based on intents in accordance with embodiments of the invention.

FIG. 5 is a graphical user interface illustrating search results grouped based on intents in accordance with embodiments of the invention. The graphical user interface is a SERP 500 that illustrates the elements of an interactive SERP 500. A server computer communicatively connected to the database may generate the graphical user interface.

The interactive SERP 500 may include an input box 510 that receives one or more words. The words entered in the input box 510 may be received from the user. In response to the words entered in the input box 510, the server may access the database to obtain search results. The server updates the graphical user interface with the search results. The server, in one embodiment, identifies intents associated with the search results. The intents are used to group the search results. The intents 520 and 530 are also displayed to the user as links. A user that clicks on the link will receive a SERP having only the search results that are grouped under the intent of the clicked link.

In one embodiment, for each group of search results, the interactive SERP 500 may include attributes 540 that correspond to the intents or entities identified for the query. Optionally, the interactive SERP 500 may include modification and verification buttons 550 or 560. The modification or verification buttons allow the user to remove search results from groups or add search results to groups. These buttons may also allow the user to create new intents that may be associated with one or more of the search results.

For example, a user may enter a search for "Harry Shum" in the input box 510. The user may be logged-in to at least one service associated with the search engine. The search engine provides the interactive SERP 500 in private mode. The search engine identified at least two intents 520, 530. The two intents correspond with person entities. A first entity related to Corporate Vice President at Microsoft by the name Harry Shum, and a second entity related to the American dancer and actor by the name of Harry Shum, Jr. The interactive SERP 500 includes disambiguation controls 550 and 560. The search results are grouped based on the intents and the corresponding attributes. The first group of search results is directed to the actor and the second group of search results is directed to the Microsoft employee. The disambiguation controls 550 and 560 allow for modification of the search results in the two groups.

The graphical user interface may be configured to be a natural user interface in at least one embodiment. It may be configured to receive the queries, refinements, and modifications to the search results. The search engine updates the SERP to reflect any modifications received during private mode. Thus, the user receives results that are relevant to specific intents or entities. The user may provide information to narrow down the intents or entities for which the user receives results to eliminate irrelevant result groups.

The graphical user interface may include the top five intents associated with a query. The intents are displayed to the user in the SERP. In some embodiments, the user may click on an intent to receive a view having only the search results associated with the intent clicked by the user.

Figure 6:
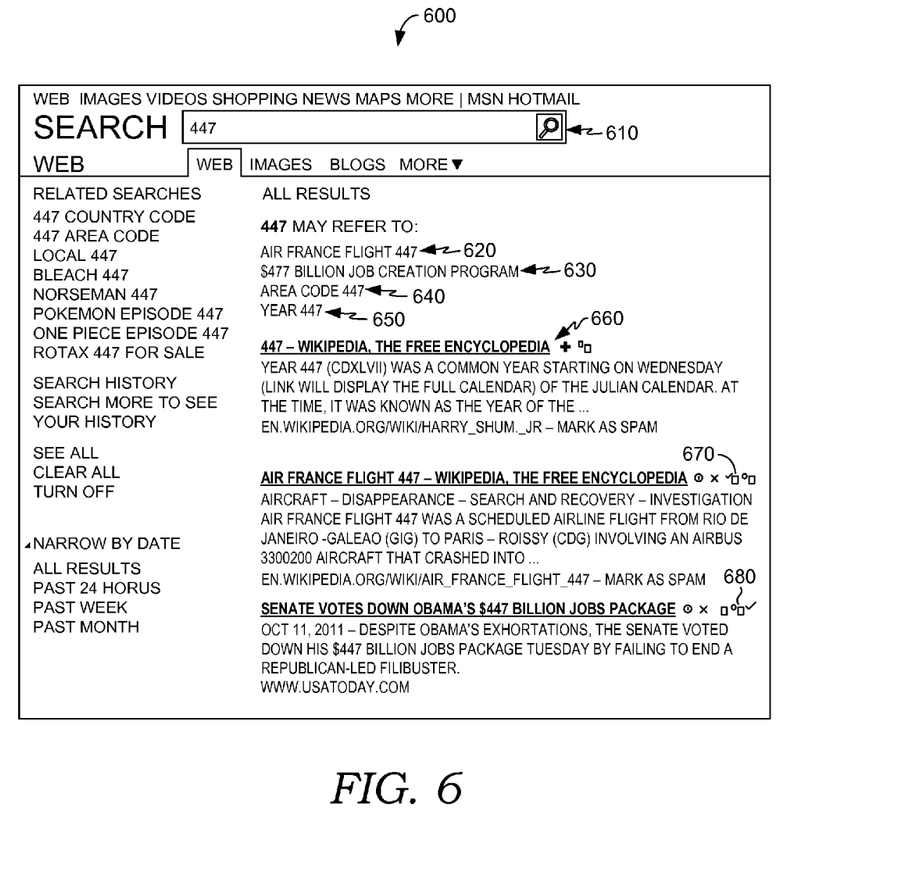
FIG. 6 is another graphical user interface illustrating search results in modifiable groups based on intents in accordance with embodiments of the invention.

FIG. 6 is another graphical user interface illustrating search results in modifiable groups based on intents, in accordance with an embodiment of the invention. The graphical user interface is a SERP 600 that illustrates the elements of the interactive SERP 600. A server computer communicatively connected to the database may generate the graphical user interface.

The interactive SERP 600 may include an input box 610 that receives one or more words. The words entered in the input box 610 may be received from user. In response to the words entered in the input box 610, the server may access the database to obtain search results. The server updates the graphical user interface with the search results. The server, in one embodiment, identifies intents 620, 630, 640, and 650 associated with the search results. The intents are used to group the search results. The intents 620, 630, 640, and 650 are also displayed to the user as links. A user that clicks on the link will receive a SERP having only the search results that are grouped in the intent of the clicked link. The modification controls 660, 670, and 680 become available to the user logged-in to a service associated with the search engine. These controls allow the user to enter new intents or entities, remove search results from a group, add search results to the groups, or verify that the search results belong to the group selected by the search engine.

Accordingly, the search engine is configured to provide an ordered set of intents and search results. The intents may include entities represented in the search query or the search results. The search engine ranks the identified intents or entities to distinguish a relative level of match between the search results and the selected intent or entity. In some embodiments, the search engine parses the query to identify entities in the query and identify a ranked set of matches for each identified entity. In other cases, the search engine may consider the query as a whole and rank a set of matches for all of the entities in the query. Ranking may include various well-known techniques for scoring a level of match between a given entity in the query and a candidate set of entities from the database.

Embodiments of the invention group the matches to disambiguate among multiple entities or intents. An interactive SERP may also be utilized to receive feedback that further disambiguates the search results. For example, the search engine may display the ranked list of potentially matching entities to the user and ask the user to select one (or more) or to verify the groupings suggested by the search engine. In an alternative embodiment, the search engine may determine that the level of match for the highest ranked entity exceeds a threshold sufficient to automatically identify that entity as the matching entity. For instance, the search engine may determine that only one intent or entity is available for President Barack Obama of USA based on the scores associated with other intents.

Embodiments of the invention generate the interactive SERP to disambiguate queries. The queries and search results are disambiguated based on refinements selected by the user, modification to groups, and new intents entered by the user for association with a search result. The modifications may be stored for later use when a similar query is received by the search engine.

The embodiments of the invention have been described in relation to particular embodiments, which are intended in all respects to be illustrative rather than restrictive. Alternative embodiments will become apparent to those of ordinary skill in the art to which the present invention pertains without departing from its scope. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. In other words, the patent has been described in language specific to structural features or methodological acts it is to be understood that the subject matter defined in the appended claims is not necessarily limited to the specific features or acts described above. Rather, the specific features and acts described above are disclosed as example forms of implementing the claims.

The technology claimed is:

1. A computer-implemented method to generate search engine result pages, the method comprising:
   receiving a query from a user;
   identifying one or more entities included in the query;
   identifying search results associated with the query;
   locating a plurality of intents associated with the identified search results, wherein each of the plurality of intents corresponds to an entity or entity attribute of interest to the user;
   grouping the search results based on the located plurality of intents;
   generating a search engine results page that includes the identified search results and the located plurality of intents that are associated with the identified search results;
   providing the search engine results page for display on a user device;
   receiving feedback from the user regarding accuracy of the search results grouping based on the located plurality of intents, the feedback being received upon determining that the user is logged in to one or more services associated with a search engine, wherein the feedback verifies the search results groupings, removes one or more search results from the search results groupings, or adds one or more search results to the search results groupings based on the located plurality of intents;
   updating the search engine results page based on the user feedback, the updated search engine results page including additional entity attributes associated with the intents corresponding to the identified search results and including user profile attributes maintained by the one or more services the user is logged in to; and
   transmitting the updated search engine results page for display on the user device.

2. The computer-implemented method of claim 1, wherein the query includes an entity name.

3. The computer-implemented method of claim 2, further comprising:
   locating, in an entity database, one or more records that match the entity name;
   including further entity attributes associated with the matching one or more records in the search engine results page for display on the user device; and
   receiving a selection of the entity name or further entity attributes to refine the query.

4. The computer-implemented method of claim 1, wherein at least one of the located plurality of intents associated with the identified search results is an entity attribute of interest to the user, and wherein the entity attribute is one of gender, employment, cost, or name.

5. The computer-implemented method of claim 1, wherein the one or more services associated with the search engine include a social network application, messaging application, or an email application.

6. One or more hardware computer-readable media having computer-executable instructions embodied thereon for performing a method to refine search results returned by a search engine having, processors in communication with the hardware media for executing the following method steps:

receiving a user query by the search engine;

determining whether a client is in public mode or private mode, wherein the private mode is enabled when the user is logged in to one or more services associated with the search engine and public mode is enabled when the user is not logged in to the one or more services associated with the search engine;

when the user is in public mode, providing a public set of search results that match the query; and when the user is in private mode, providing a private set of search results that match the query and profile information associated with the one or more services that the user is logged-in to and ranking the private set of search results based on the match between the search results and user profile attributes maintained by the one or more services.

7. The media of claim 6, wherein the private set of search results and public set of search results are associated with intents based on representative terms included in prior queries and click frequencies associated with the private and public sets of search results as recorded in a query log.

8. The media of claim 7, wherein, in private mode, the click frequencies and prior queries are associated with the user that is logged in to the one or more services.

9. The media of claim 7, further comprising:

grouping the private set of search results and public set of search results based on intents.

10. The media of claim 7, wherein the intents include entity name or entity attributes.

11. The media of claim 10, further comprising: matching the user profile attributes with entity attributes.

12. A computer system for providing search results, the computer system comprising:

a memory storing entities and corresponding content; and a processor communicatively connected to the memory that executes the following:

(1) an intent detector component that determines representative terms based on a user query, search results corresponding to the user query, and click frequencies associated with the search results, wherein representative terms are used to associate search results with at least one intent, (2) a ranker component that ranks the search results based on the representative terms associated with the user query, and (3) a presenter component that groups the search results into groups based on the representative terms for display on a client device, wherein the representative terms correspond to an entity or attributes of an entity and the search results are tagged with a graphical indication that represents the entity or entity attributes associated with one or more of the at least one intents.

13. The system of claim 12, wherein the processor further executes a feedback component that receives user modifications to the groups.

14. The system of claim 12, wherein the presenter component further generates a search engine results page that includes the groups of search results, wherein each group represents a different intent for the user query.

15. The system of claim 14, wherein each group is associated with a navigable link that generates a new search engine results page with search results that are associated with the intent of the navigable link upon appropriate interaction by the user.

16. The system of claim 14, wherein the search engine results page includes buttons that allow a user to add search results to each group and buttons to remove search results from each group.

17. The system of claim 14, wherein the search engine results page includes buttons that allow a user to create a new intent and buttons to group search results with the new intent.

18. The system of claim 14, wherein for a user that is currently logged-in, the search engine results page is updated to include controls that allow the user to create a new intent and to group search results associated with the new intent, controls that allow the user to add search results to each group, and controls that allow the user to remove search results from each group.

\* \* \* \* \*